(12) United States Patent
Thornham et al.

(10) Patent No.: US 10,942,077 B2
(45) Date of Patent: Mar. 9, 2021

(54) SMART BICYCLE WHEEL SENSOR SYSTEM

(71) Applicant: FLO Cycling LLC, Las Vegas, NV (US)

(72) Inventors: Jonathan C. Thornham, Las Vegas, NV (US); Christopher J. Thornham, San Diego, CA (US); Damon E. Pendarvis, Morrow, OH (US)

(73) Assignee: FLO Cycling, LLC, Las Vegas, NV (US)

( * ) Notice: Subject to any disclaimer, the term of this patent is extended or adjusted under 35 U.S.C. 154(b) by 0 days.

(21) Appl. No.: 16/534,642

(22) Filed: Aug. 7, 2019

(65) Prior Publication Data
US 2020/0049581 A1     Feb. 13, 2020

Related U.S. Application Data

(60) Provisional application No. 62/715,291, filed on Aug. 7, 2018.

(51) Int. Cl.
| | | |
|---|---|---|
| *B62J 3/00* | (2020.01) | |
| *G01L 17/00* | (2006.01) | |
| *B62J 99/00* | (2020.01) | |
| *B60B 27/02* | (2006.01) | |
| *B62J 45/40* | (2020.01) | |

(52) U.S. Cl.
CPC ............ *G01L 17/00* (2013.01); *B60B 27/023* (2013.01); *B62J 99/00* (2013.01); *B62J 45/40* (2020.02)

(58) Field of Classification Search
None
See application file for complete search history.

(56) References Cited

U.S. PATENT DOCUMENTS

| | | | | |
|---|---|---|---|---|
| 9,821,614 | B1* | 11/2017 | Brown | B60C 23/0498 |
| 2010/0236325 | A1* | 9/2010 | Tanuma | B60C 23/0408 |
| | | | | 73/146.3 |
| 2015/0247775 | A1* | 9/2015 | Kanenari | B60C 23/0494 |
| | | | | 73/146.5 |
| 2016/0129738 | A1* | 5/2016 | Luce | B60C 23/20 |
| | | | | 73/756 |
| 2017/0197112 | A1* | 7/2017 | Shiang | G01L 3/247 |
| 2019/0061441 | A1* | 2/2019 | Boutru | B60C 23/04 |
| 2020/0001668 | A1* | 1/2020 | Buttimer | B60C 23/0408 |
| 2020/0094634 | A1* | 3/2020 | Decoster | B60C 23/003 |

OTHER PUBLICATIONS

Quarq Tyrewiz, https://www.quarq.com/product/tyrewiz/, © 2019 SRAM, LLC, unknown author, 3 pages.
Bikerumor ! EB18: Hutchinson teases Connec'tires wireless pressure sensor & tan wall tires by Zack Overholt, https://bikerumor.com/2018/07/17/eb18-hutchinson-teases-connectires-wireless-pressure-sensor-tan-wall-tires/ © 2019 BikeBoardMedia, Inc., Jul. 17, 2018, 6 pages.

* cited by examiner

*Primary Examiner* — Julie B Lieu
(74) *Attorney, Agent, or Firm* — Weide & Miller, Ltd.

(57) ABSTRACT

A bicycle wheel sensor is provided and includes a housing configured to be at least partially disposed within a tire of a bicycle wheel. The sensor may be mounted opposite a valve stem location to help balance the bicycle wheel. The bicycle wheel sensor has one or more sensors exposed to the inside of the tire and is configured to provide data obtained from within the tire. The sensor includes an electronic control unit that receives the data from the sensors and transmits the data to a user device via a transceiver.

18 Claims, 10 Drawing Sheets

SMART BICYCLE WHEEL SENSOR SYSTEM

CROSS-REFERENCE TO RELATED APPLICATION

This application claims priority to U.S. Provisional Application No. 62/715,291, which was filed on Aug. 7, 2018, the contents of which are hereby incorporated by reference.

BACKGROUND

The disclosed embodiments relate to vehicle sensor systems. More specifically, the disclosed embodiments relate to bicycle sensors and particularly to wheel bicycle sensors.

Cycling is an enjoyable pastime for both the casual and professional rider. Riders of almost all skill levels have more and more access to data to help them become better riders. For example, smartphones or other GPS devices may be used when cycling to track speed, distance, elevation change, split times, and the like. Heart rate monitors may also be used to monitor the user's conditioning during one or more rides.

However, some information that riders may be interested in is not currently available to them. These conditions include data that may only be obtained from the inside of a bicycle tire on a bicycle wheel. For example, while air pressure may be detected at a valve stem, this requires opening the valve. Thus, while a reading may be obtained, pressure may also be lost while the valve is opened to obtain the reading. Furthermore, any pressure changes during a ride cannot be obtained. Other environmental factors within the tire or wheel data may also be of interest to enhance the riders training or to add to the safety of the rider.

Accordingly, a system or device to obtain data from the inside of a bicycle tire during a ride is desired.

SUMMARY

A bicycle wheel sensor is provided and includes a housing configured to be disposed at least partially within a tire of a bicycle wheel. In some instances, it is beneficial to mount the bicycle wheel sensor opposite a valve stem location to help balance the bicycle wheel. The bicycle wheel sensor has one or more sensors that is exposed to the inside of the tire and is configured to provide data obtained from within the tire. The bicycle wheel sensor includes an electronic control unit that receives the data from the sensors and transmits the data to a user device via a transceiver.

In some embodiments, the housing is configured to be mounted at a spoke hole. The housing may be shaped to extend along the wheel from the spoke hole to at least a point on the bicycle wheel opposite the valve stem location. The housing may further comprise one or more balancing weight mounts configured to receive balancing weights. The housing may also have an elongated hole to facilitate adjustable positioning of the housing to the bicycle wheel at the spoke hole opposite the valve stem location.

In some embodiments, the one or more sensors comprise a pressure sensor and an accelerometer. Other sensors may also be used such as a gyroscope, humidity sensor, and thermometer. The transceiver may be configured to communicate according to one or more known wireless standards such as Bluetooth Low Energy and ANT+ protocols.

In some embodiments, the housing of the bicycle wheel sensor comprises a flanged portion on a front end thereof. A rear end of the housing may extend through an opening in the rim between spoke holes which are on the rim. The opening may be disposed opposite a valve stem of the bicycle wheel so that the bicycle wheel sensor may aid in balancing the wheel.

The flanged portion may include an aperture exposed to the enclosed area. A pressure sensor and/or other sensors may be disposed within the aperture. The flanged portion may be hermetically sealed to an outer rim wall of the bicycle wheel rim.

In some embodiments, the bicycle wheel sensor comprises a charge port disposed on an inner rim wall of the bicycle wheel rim. This allows access to the sensor to charge the sensor without disassembling the bicycle wheel. The housing may be comprised of a top housing and a bottom housing, the top housing and the bottom housing being hermetically sealed to one another. The flanged portion may include through holes to receive fasteners to attach the flanged portion to the bicycle wheel rim.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF EMBODIMENTS

Figure 1:
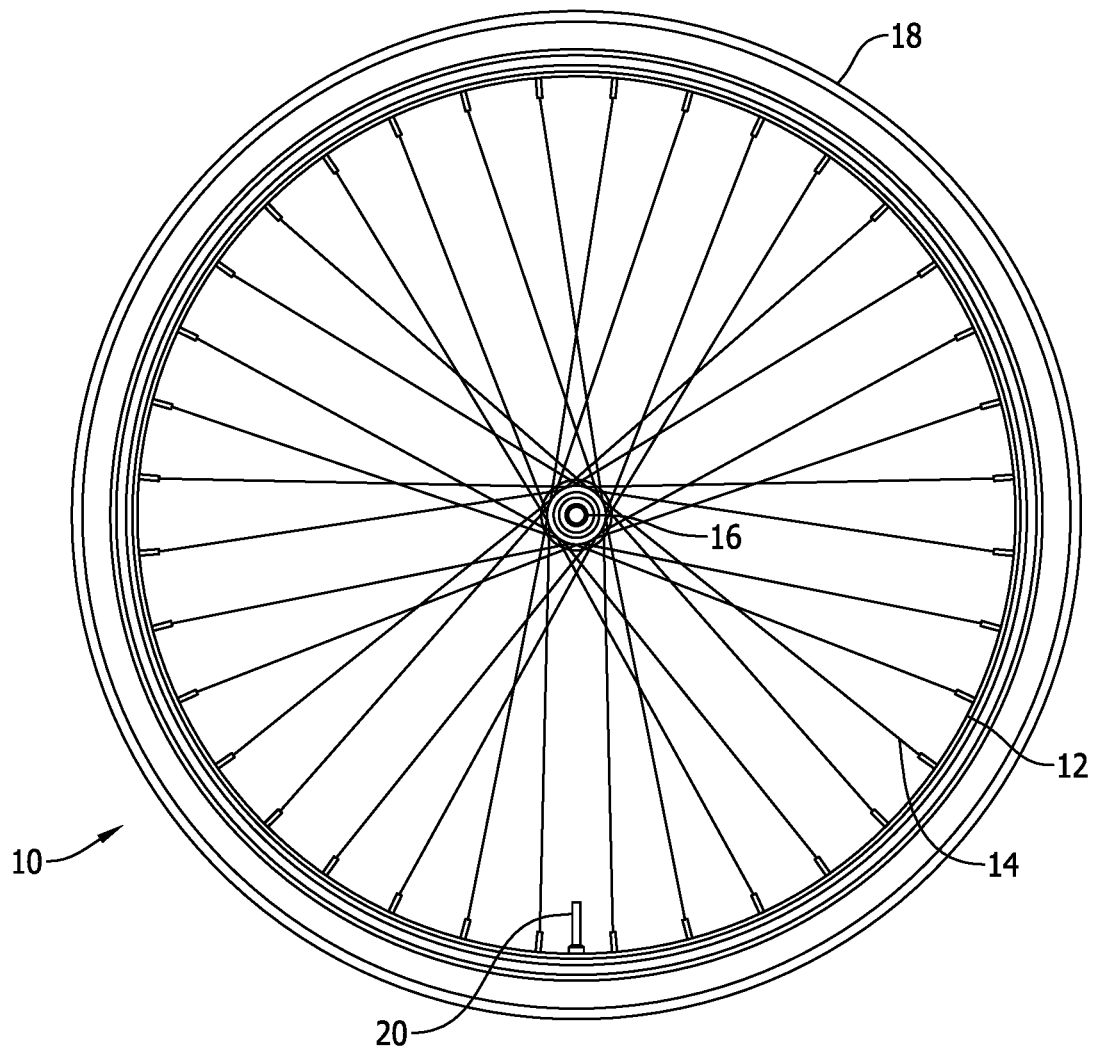
FIG. 1 shows an example of a bicycle wheel and tire.

FIG. 1 shows an example of a bicycle wheel and tire. A typical bicycle wheel and tire 10 includes a rim 12 formed in an annular shape that provides structure to the overall wheel. Spokes 14 extend from a hub 16 to provide rigidity to the wheel. The hub 16 includes an axle which is mounted to a bicycle frame. A tire 18 is fitted over the rim 12 and provides the riding interface with the ground for the bicycle. Tires 18 are typically formed from a rubber or synthetic rubber material. The rim 12 and tire 18 may be part of a tubeless system, or a tube may be inserted into the tire 18.

The wheel 10 in a tubeless system or the tube in a tubed system includes a valve stem 20. The valve stem 20 allows air or another fluid to be inserted into the tire 18 (or tube within the tire).

Figure 2A:
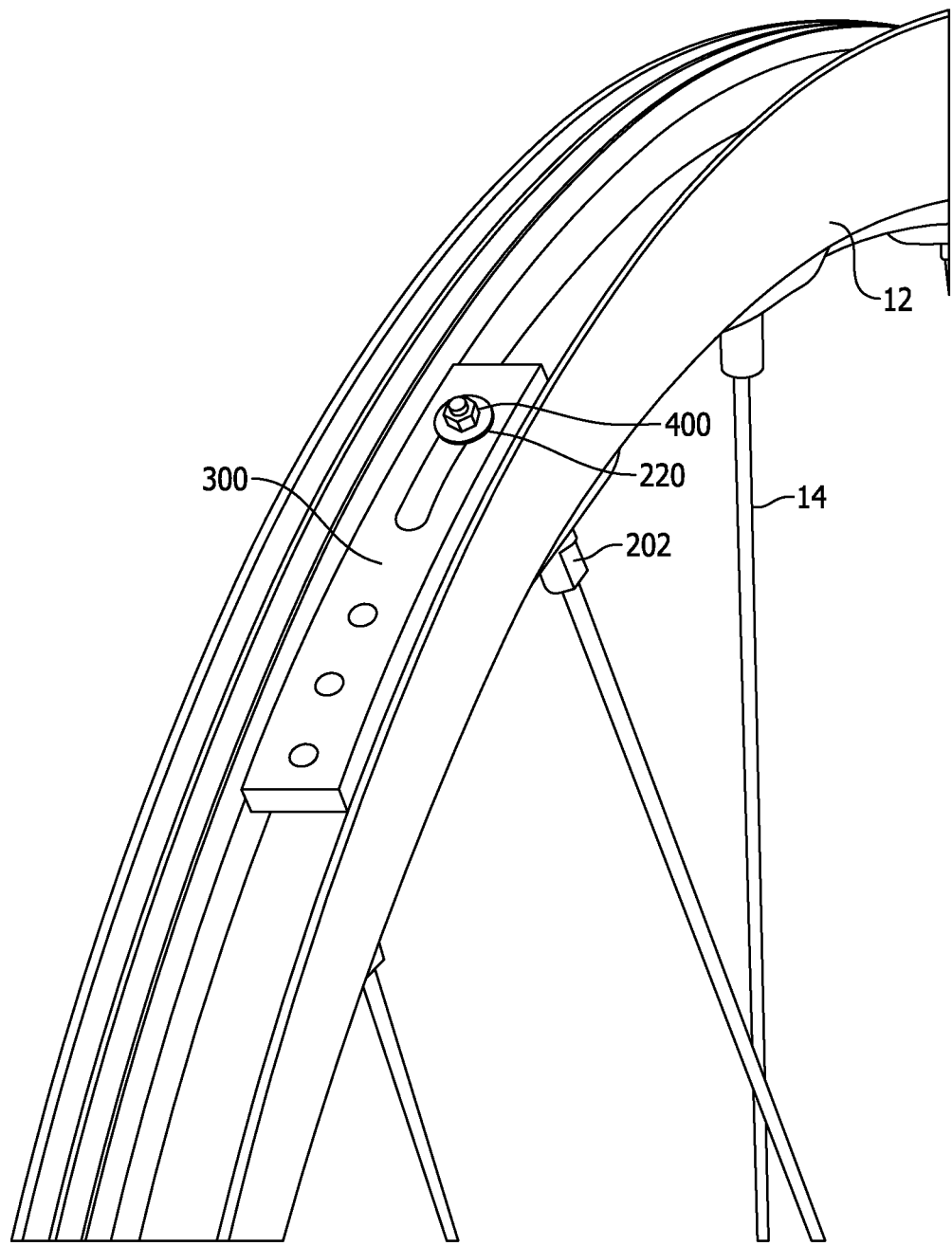
FIG. 2A shows an enlarged portion of a bicycle wheel without a tire and showing a bicycle wheel sensor device, according to one exemplary embodiment.

FIG. 2A shows an enlarged portion of a bicycle wheel without a tire and showing a bicycle wheel sensor device, according to one exemplary embodiment. As shown in FIG. 2A, the spokes 14 are connected to the rim 12 via the spoke nipples 202. The spoke nipples 202 may also be used to true the rim 12 to ensure the roundness and runout of the rim 12.

A bicycle wheel sensor 300 is positioned on an outer surface of the rim 12. Preferably, the bicycle wheel sensor is positioned such that it serves to balance the wheel 10. Thus, the bicycle wheel sensor 300 is configured so that its position may be adjustable along the rim 12. The weight of the bicycle wheel sensor 300 may also be adjusted as will be explained in more detail below.

In order balance the wheel 10, the bicycle wheel sensor 300 may be placed opposite the valve stem 20 to counterbalance the added weight of the valve stem 20. However, typically the valve stem 20 is located between two spokes, and thus the area opposite valve stem 20 on the rim where the counterbalance is needed is also between two spokes. In this embodiment, to mount the bicycle wheel sensor 300 to the rim, it is preferable to access the rim from a spoke hole. Thus, as shown in FIG. 2A, the bicycle wheel sensor 300 has a mount on one side of the bicycle wheel sensor so that the bicycle wheel sensor extends from the mount that corresponds to a spoke over the area that is opposite the valve stem. Thus, the bicycle wheel sensor 300 can provide balance to the wheel while being mounted at a spoke hole in the rim 12.

Figure 2B:
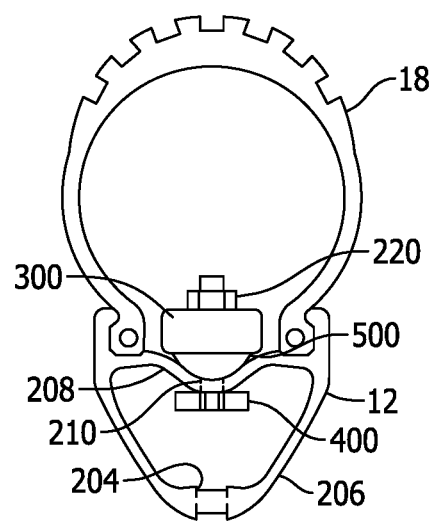
FIG. 2B shows a cross-section view of a bicycle tire and a bicycle wheel sensor device, including an attachment device for the bicycle wheel sensor.
Figure 2C:
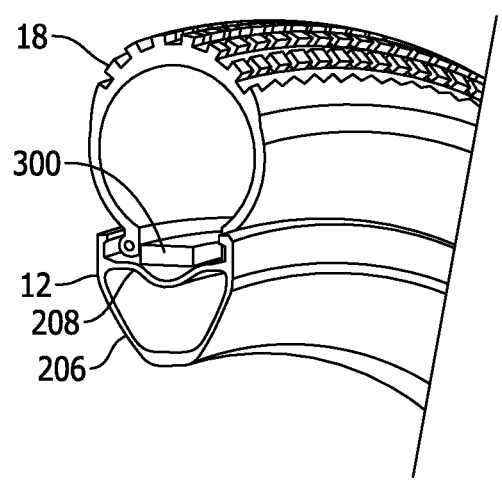
FIG. 2C shows a perspective cross section of the bicycle wheel with the bicycle wheel sensor.

FIG. 2B shows a cross-section view of a bicycle tire and a bicycle wheel sensor device, including an attachment device for the bicycle wheel sensor; and FIG. 2C shows a perspective cross section of the bicycle wheel with the bicycle wheel sensor. As shown in FIGS. 2B and 2C, some rims 12 include an inner rim wall 206 and an outer rim wall 208. A spoke hole 204 is disposed within the inner rim wall 206. A nipple of a spoke 14 seats at the spoke hole 204 so the spoke 14 does not need to be removed to access the outer rim wall 208 or a spoke access hole 210.

The bicycle wheel sensor 300 may be mounted to the outer rim wall 208 so that it is disposed in the enclosed area between the rim 12 and the tire 18. Here, the bicycle wheel sensor 300 may measure conditions in the space enclosed by the rim 12 and the tire 18. The bicycle wheel sensor 300 is mounted to the rim 12 via a bolt 400. The bolt 400 may secure the bicycle wheel sensor 300 via a nut 220. The bolt 400 extends through a spoke access hole 210 which serves as a mounting aperture within the outer rim wall 208. A gasket 500 is provided to seal the spoke access hole 210 when the bicycle wheel sensor 300 is tightened against the rim 12 by the bolt 400 and nut 220.

Of course, other methods may also be used to mount the bicycle wheel sensor 300 such that the bicycle wheel sensor may be positioned within the enclosed area between the rim 12 and the tire 18. For example, other types of fasteners other than the bolt 400 and nut 220 may be used such as screw, rivets, etc. The fasteners may be attached at any position along the rim 12 in addition to being placed at a spoke access hole 210 as described above.

In one embodiment, an adhesive may be used to adhere the bicycle wheel sensor 300 to the outer wall 208 of the rim or to an inner surface of the tire 18. In another embodiment, the bicycle wheel sensor 300 may be built into or encased in a rim strap that is placed around the outer wall 208 of the rim 12. As another alternative, the bicycle wheel sensor 300 may be encased in expandable foam that is secured between the rim 12 and the tire 18. The bicycle wheel sensor 300 may be built into or encased on a tire tube's interior or exterior. The bicycle wheel sensor 300 may also be attached to the valve stem internally or externally.

Figure 3A:
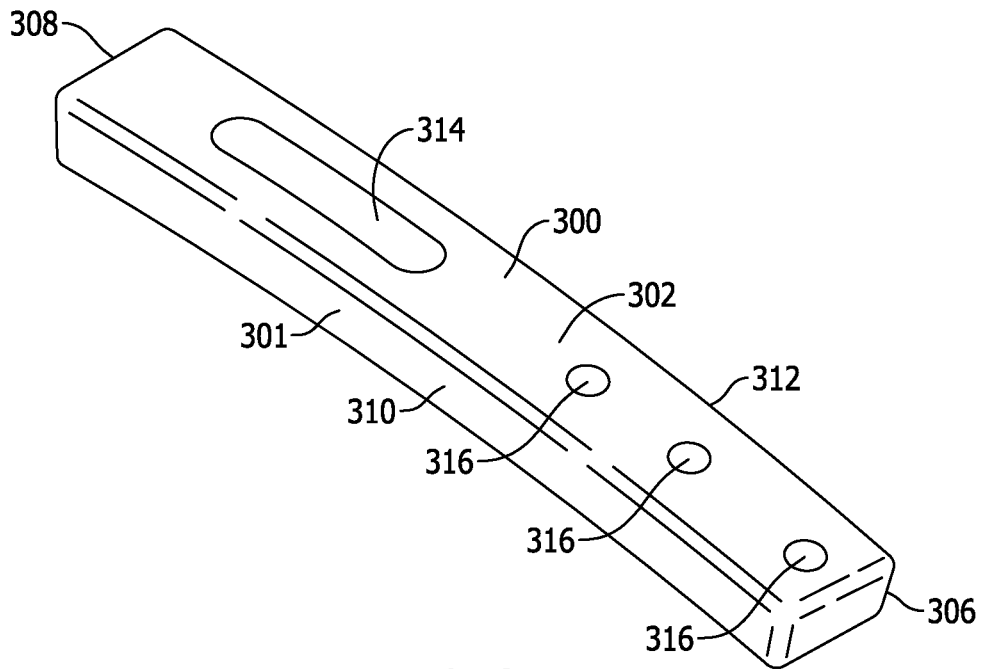
FIG. 3A shows a perspective view of the bicycle wheel sensor, according to one exemplary embodiment.
Figure 3B:
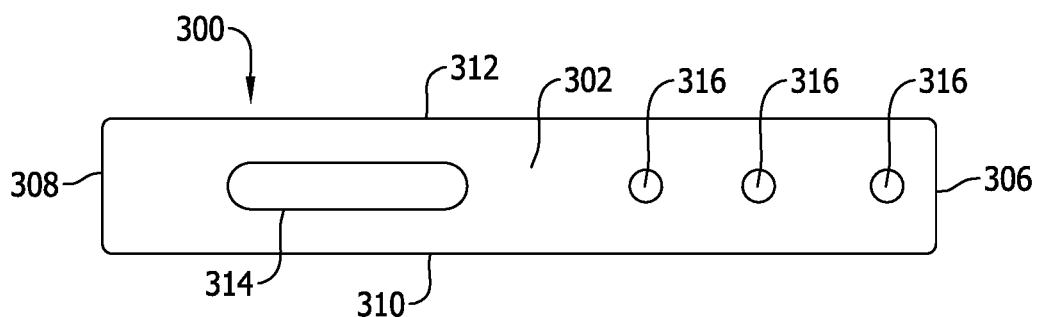
FIG. 3B shows a top view of the bicycle wheel sensor in FIG. 3A.
Figure 3C:
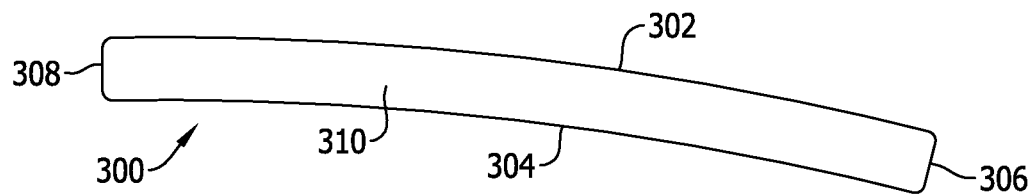
FIG. 3C shows a side view of the bicycle wheel sensor of FIG. 3A.

FIG. 3A shows a perspective view of the bicycle wheel sensor, according to one exemplary embodiment; FIG. 3B shows a top view of the bicycle wheel sensor in FIG. 3A; and FIG. 3C shows a side view of the bicycle wheel sensor of FIG. 3A. The bicycle wheel sensor 300 comprises a housing 301. The housing 301 includes a top side 302, a bottom side 304, a first end 306, a second end 308, a first side 310, and a second side 312. The housing 301 is formed with a curvature to match the frame 12 of a bicycle wheel 10 as shown in FIG. 2A. That is, as best seen in FIG. 3C, the top surface 302 and the bottom surface 304 have a radius of curvature to match a wheel on which the bicycle wheel sensor 300 is mounted. For example, the radius of curvature of the bottom surface 304 may match a 700C wheel, or any other wheel as desired.

An elongated through-hole 314 runs partially along the length of the housing 301 from the top surface 302 to the bottom surface 304. The elongated hole 314 is positioned on one side of the housing 301. As shown, the positioning of the elongated hole 314 is closer to the second end 308 than the first end 306, although the elongated hole 314 could be positioned at either end. The elongated hole 314 allows the position of the mounting of the bicycle wheel sensor 300 to be adjusted so that the wheel 10 can be balanced. As explained above, the bicycle wheel sensor 300 is disposed on the wheel 10 opposite the valve stem 20 to balance the wheel 10. The elongated hole 314 is aligned with a spoke hole 204 almost opposite the valve stem 10. The placement of the elongated hole 314 near the end 308 of the housing 302 allows the housing 301 to extend along the wheel so that at least a portion of the housing 301 is opposite the valve stem 20. The balance of the wheel 10 may be achieved at least in part by fine tuning the positioning of the housing 301 on the wheel 10 via the elongated hole 314.

The housing 301 further comprises one or more holes 316 in the top surface 302 of the housing 301. The holes 316 serve as balancing weight mounts and may receive balancing weights (not shown) to further help precisely balance the wheel. In the figures, there are three holes 316 disposed on an opposite end of the housing 301 from the elongated hole 314. However, any number and arrangement of holes may be used. Preferably, the holes 316 are positioned such that when the housing is mounted on a wheel, at least one of the holes 316 will be directly opposite the stem valve 20 on the wheel 10.

Figure 4:
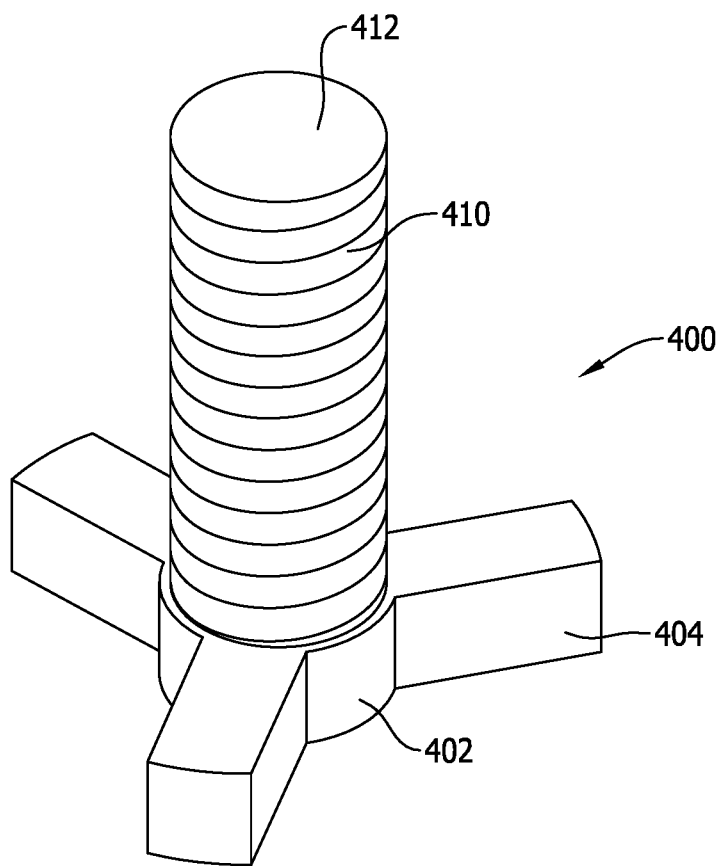
FIG. 4 shows an attachment bolt for a bicycle wheel sensor, according to one exemplary embodiment.

FIG. 4 shows an attachment bolt for a bicycle wheel sensor, according to one exemplary embodiment. A bolt 400 is used to mount the bicycle wheel sensor 300 to the wheel 10 as shown in FIG. 2A-2C. The bolt 400 may include a head 402 having wings 404 to provide tension on the rim when the nut 220 is tightened to hold the sensor 300 in place on the rim 12. There are three wings 404 shown in FIG. 4, but any number of suitable wings 404 may be used. The bolt 400 also comprises a threaded portion 410 extending to a distal end 412.

Figure 5:
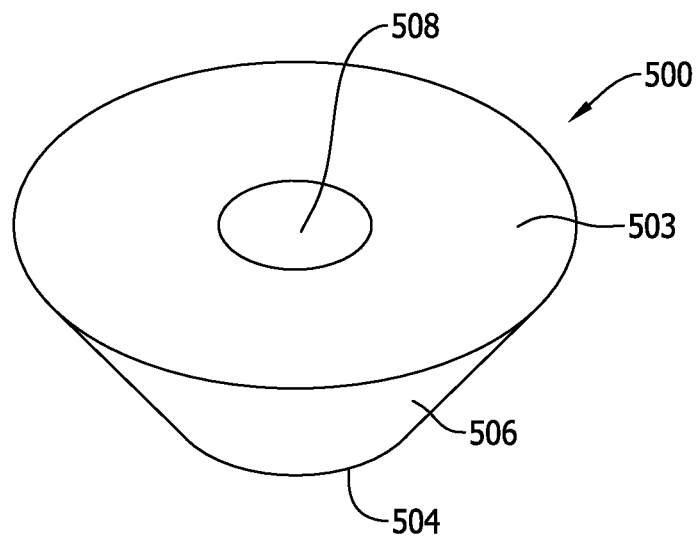
FIG. 5 shows a gasket for installing a bicycle wheel sensor, according to one exemplary embodiment.

To ensure that the wheel 10 and tire 18 remain air tight, a grommet or gasket 500 is provided. FIG. 5 shows a gasket for installing a bicycle wheel sensor, according to one exemplary embodiment. The gasket 500 comprises a first end 503 and a second end 504. The gasket 500 is formed in a flat conical shape where an area of the bottom end 504 is less than an area of the top end 503. An annular sidewall 506 extends from the first end 503 to the second end 504. A through hole 508 is provided that runs from the first end 503 to the second end 504 to accommodate the bolt 400 (FIG. 2B-2C). The gasket 500 is formed from a resilient material that deforms to seal against surrounding surfaces when placed under compression. For example, the gasket 500 may be formed from a natural or synthetic rubber material.

Figure 6:
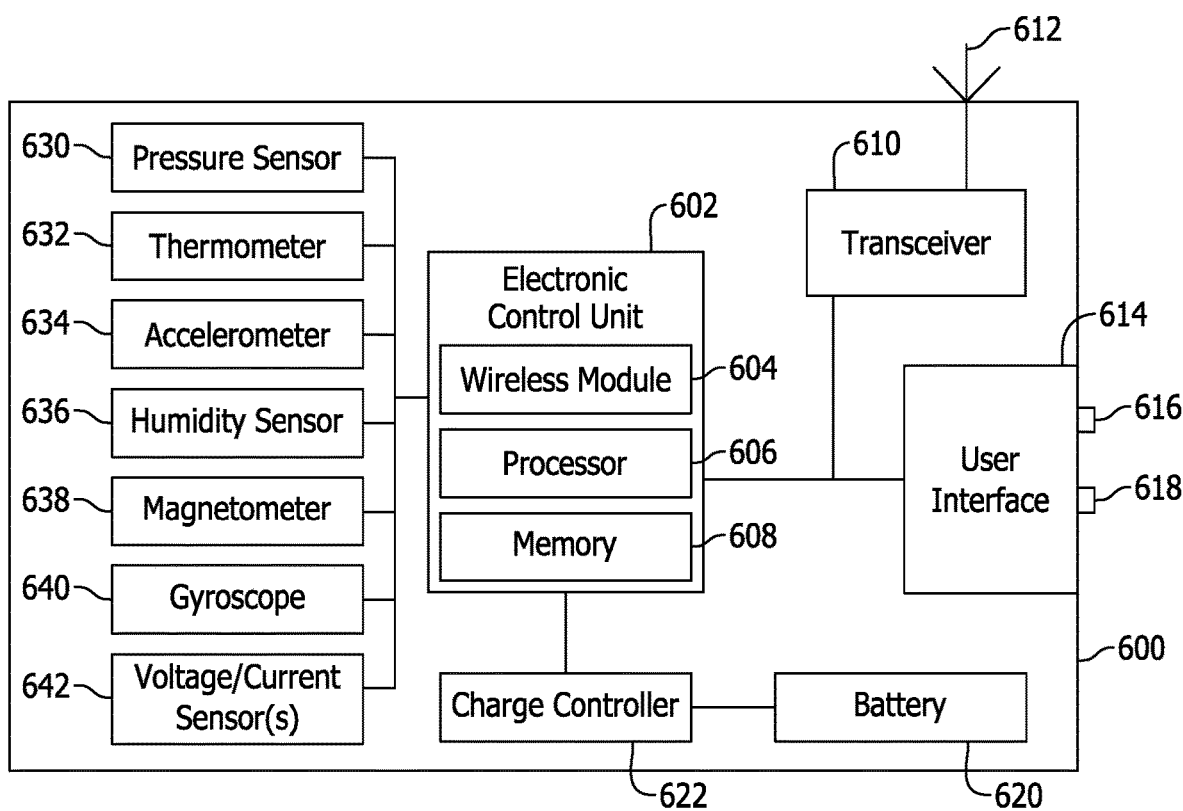
FIG. 6 shows a schematic of a bicycle wheel sensor, according to one exemplary embodiment.

FIG. 6 shows a schematic of a bicycle wheel sensor, according to one exemplary embodiment. In FIG. 6, a bicycle wheel sensor 600 may be similar to the bicycle wheel sensor 300 shown in FIGS. 3A-3C. In order to provide relevant information to a bicycle rider, the bicycle wheel sensor 600 comprises a plurality of components. The components are controlled by an electronic control unit ("ECU") 602. The ECU comprises a wireless module 604 that controls wireless communication to and from the bicycle wheel sensor 600. The wireless module 604 may be configured to process communications in any desired communication protocol. For example, the wireless module 604 may be configured according Bluetooth Low Energy and/or ANT+ wireless protocols.

The ECU 602 further comprises a processor that communicates with the other components of the bicycle wheel sensor 600. The processor 604 may comprise any type of processor or controller capable of performing as described herein. The processor 604 may comprise a general-purpose microprocessor or microcontroller, ASIC, DSP, or any other type of processing device.

The ECU 602 may also include one or more memories 608. The one or more memories 608 are part of the bicycle wheel sensor 600 for storage of machine readable code for execution on the processor 606 and for storage of data, such as sensor data, user data, accelerometer data, or any other type of data. The memory 608 may comprise RAM, ROM, flash memory, optical memory, or micro-drive memory. The machine-readable code as described herein is non-transitory.

The ECU 602 and other elements of the bicycle wheel sensor 600 receive power from a battery 620 or other similar power source. A charge controller 622 controls power delivery to the battery and may provide one or more electrical ports to electrically interface with the bicycle wheel sensor 600, such as with a second electronic device, computer, or a power supply/charging device. In some embodiments, the charge controller 622 may facilitate wireless charging, such as through inductive charging.

As part of this embodiment, the ECU 602 connects to a user interface 614. The user interface 614 may comprise any system or device configured to accept user input to control the bicycle wheel sensor 600. For example, the user interface 614 may comprise one or more buttons 616 to control the functionality of the bicycle wheel sensor 600, such as to pair the bicycle wheel sensor 600 with a mobile device via one or more communication protocols, such as Bluetooth Low Energy or ANT+. The user interface 614 may also comprise one or more LEDs 618 or other indicator to provide status feedback to the user, such as a connection status or low battery indicator.

Also connected to the ECU 602 is a wireless transceiver 610 which connects to a respective antenna 612. The transceiver 610 is configured to receive incoming signals from a remote transmitter and perform analog front-end processing on the signals to generate analog baseband signals. The incoming signal may be further processed by conversion to a digital format, such as by an analog to digital converter, for subsequent processing by the ECU 602. Likewise, the transceiver 610 is configured to receive outgoing signals from the ECU 602, or another component of the bicycle wheel sensor 600, and up convert these signals from baseband to RF frequency for transmission over the antenna 612. Although shown with one transceiver 610, it is contemplated that the bicycle wheel sensor 600 may have two or more transceivers. For example, some devices are tri-band or quad-band capable.

It is contemplated that the bicycle wheel sensor 600, and hence the wireless transceiver 610, may be configured to operate according to any presently existing or future developed wireless standard including, but not limited to, Bluetooth Low Energy, ANT+, ISM, Wi-Fi such as IEEE 802.11 a,b,g,n, wireless LAN, WMAN, broadband fixed access, WiMAX, any cellular technology including CDMA, GSM, EDGE, 3G, 4G, 5G, TDMA, AMPS, FRS, GMRS, citizen band radio, VHF, AM, FM, UHF, and wireless USB.

Also, part of the bicycle wheel sensor 600 is one or more systems which are connected to and interface with the ECU 602. A pressure sensor 630 is provided to measure the internal air pressure of the bicycle wheel. The pressure sensor 630 is configured to be durable to withstand tire sealants or the like which may be introduced inside the tire or tube of the bicycle wheel.

A thermometer 632 may also be provided to connect to the ECU 602 and track an internal temperature of the wheel. The outputted temperature may help to identify overheating due to braking or other abnormalities occurring on the wheel. An accelerometer 634 connects to the ECU 602 to provide information or data regarding shocks or forces experienced by the bicycle wheel. In some embodiments, the accelerometer 634 may measure centrifugal forces (inertial forces) and tangential forces which may indicate a rotational speed of the bicycle wheel. A magnetometer 638 is provided to provide directional information for the bicycle wheel sensor 600. A gyroscope 640 connects to the ECU 602 to generate and provide orientation data regarding the orientation of the bicycle wheel sensor 600. In one configuration, the accelerometer 634, magnetometer 638, and gyroscope 640 generate and provide data to the ECU 602 to indicate speed data for the bicycle wheel. Voltage and/or current sensors 642 are also provided to monitor a power level of the battery 620.

Once the bicycle wheel sensor 600 is installed onto a bicycle wheel as described above, the bicycle wheel sensor 600 may be used to monitor the inside of a bicycle tire and provide relevant data to the user. The user may connect or "pair" a mobile device to the bicycle wheel sensor 600 before or after installation on the bicycle wheel. The connection is a wireless connection via known communication protocols such as Bluetooth Low Energy or ANT+.

During operation of the bicycle, the bicycle wheel sensor 600 may collect data from one or more of the systems installed on the bicycle wheel sensor 600 at predetermined time intervals. The data is collected by the ECU 602 and is transmitted to the user's mobile device via the transceiver 610. Such data may include internal pressure and humidity information indicating a condition/health of the tire, speed data based on the rotation of the wheel, and other relevant information.

Figure 7A:
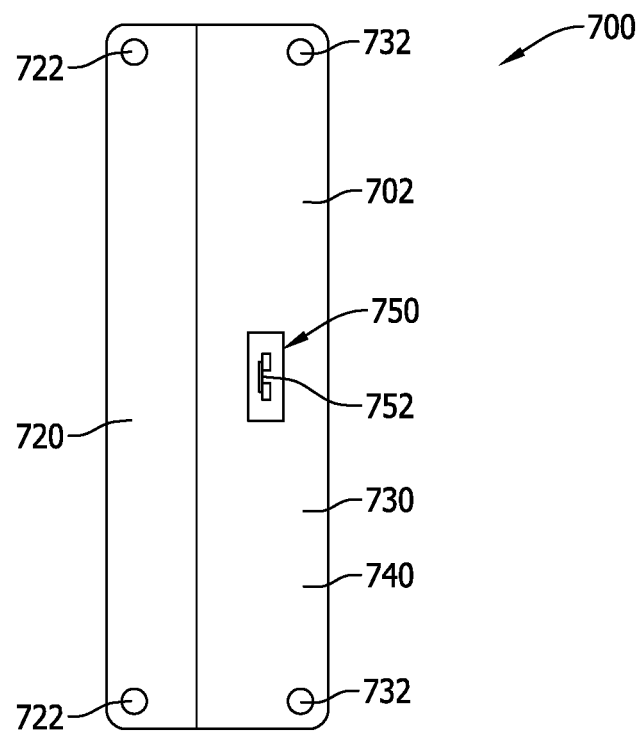
FIG. 7A shows a front view of a bicycle wheel sensor, according to one exemplary embodiment.
Figure 7B:
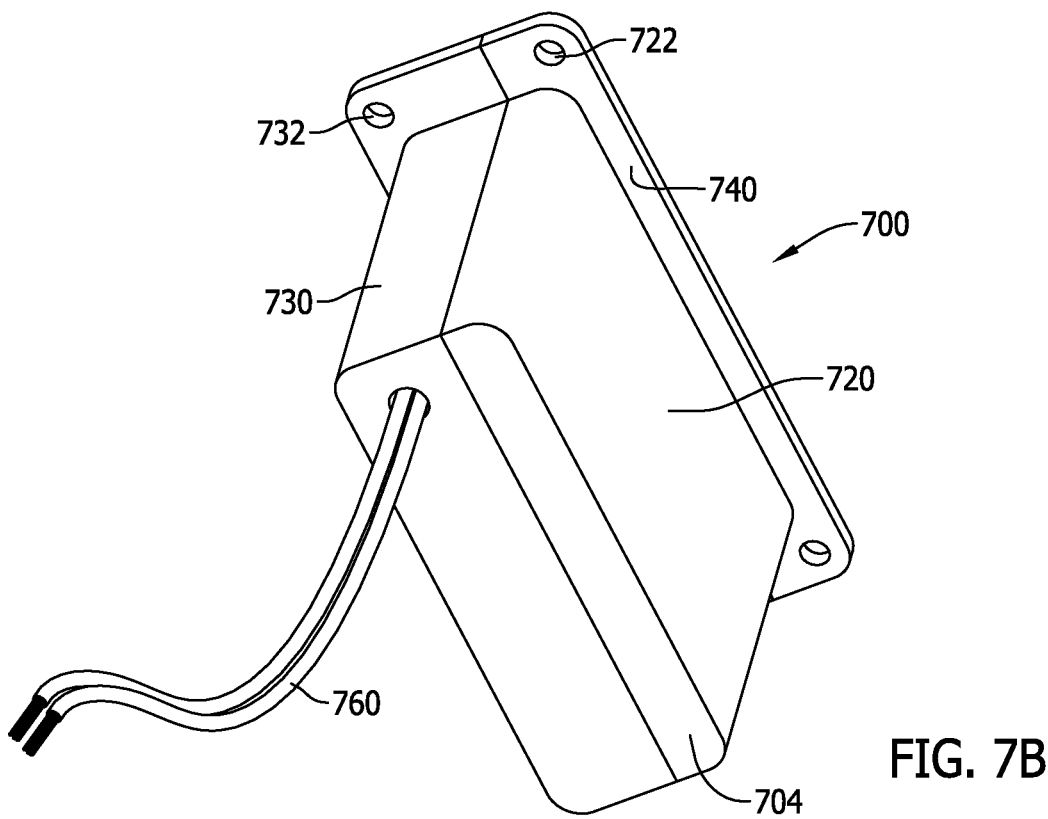
FIG. 7B shows a rear perspective view of the bicycle wheel sensor of FIG. 7A.
Figure 7C:
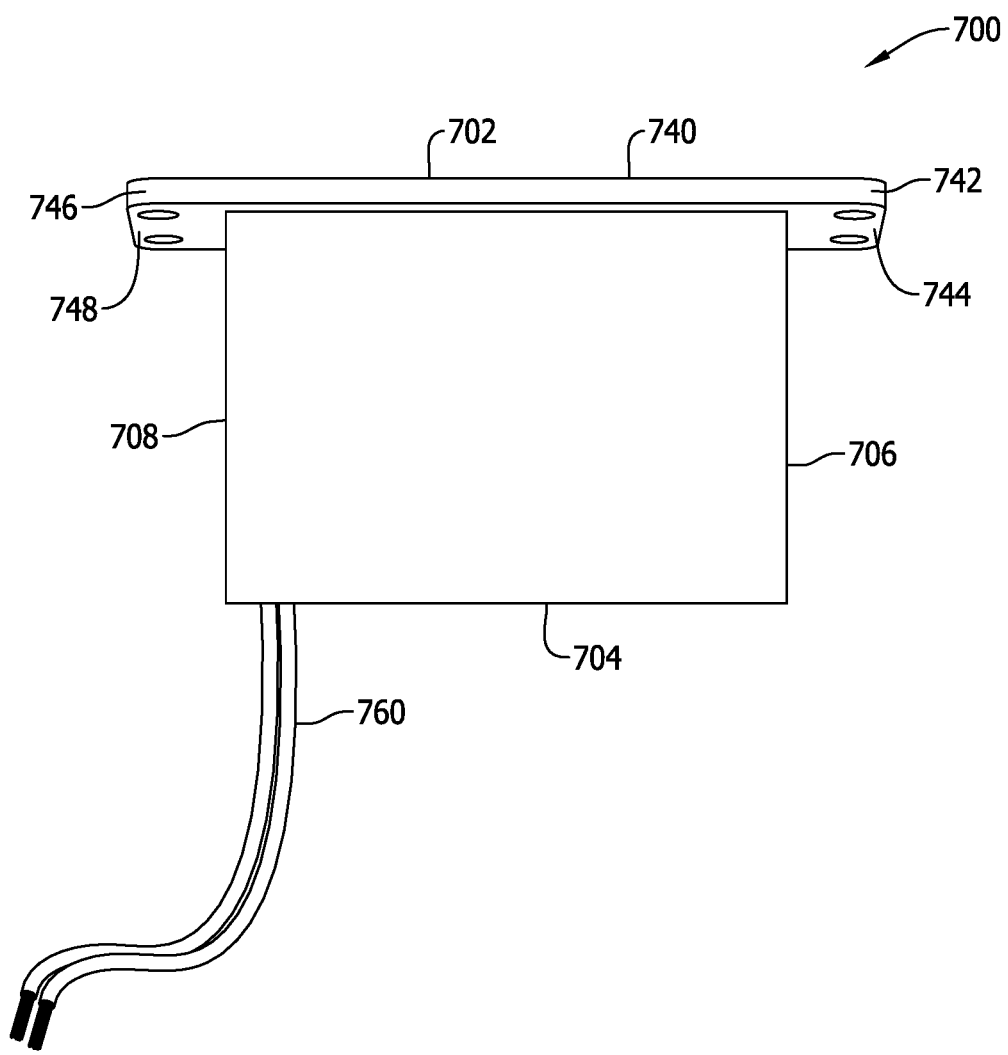
FIG. 7C shows a top view of the bicycle wheel sensor of FIG. 7A.

FIG. 7A shows a front view of a bicycle wheel sensor, according to one exemplary embodiment; FIG. 7B shows a rear perspective view of the bicycle wheel sensor of FIG. 7A; and FIG. 7C shows a top view of the bicycle wheel sensor of FIG. 7A. A bicycle wheel sensor 700 may be similar to the bicycle wheel 600 and may include some or all of the same features and components as described above with reference to FIG. 6.

The bicycle wheel sensor 700 may be formed as a two-part construction with a top housing 720 and a bottom housing 730. The top housing 720 may be fastened to the bottom housing 730 via any suitable manner such as via adhesives, a snap-fit, fasteners, or the like. In some embodiments, the interface between the top housing 720 and the bottom housing 730 is hermetically sealed. The top and bottom housing 720, 730 may be configured to house the various internal components of the bicycle wheel sensor, such as ECU 602, battery 620, and the other components shown in FIG. 6.

While the two-part construction in shown in the embodiment and allows for ease of assembly during manufacturing, other constructions are also possible. For example, the bicycle wheel sensor 700 may be formed as a single housing with a hinged door to provide access to the interior of the housing.

On a front side 702 of the bicycle wheel sensor 700, the top housing 720 and the bottom housing 730 form a mounting flange 740. The mounting flange 740 includes two apertures 722, 732 formed toward a first side 706 of the bicycle wheel sensor 700 and another two apertures 722, 732 formed on the second side 708 of the bicycle week sensor 700. The apertures 722, 732 are formed in overhangs 742, 746 of the mounting flange 740. The mounting flange 740 has a radius of curvature equal to that of the outer rim wall 208 of the bicycle wheel rim 12 (see FIG. 2C). The apertures 722, 732 and the radius of curvature facilitate the installation of the bicycle wheel sensor 700 to the rim 12, as will be described in more detail below.

As shown in FIG. 7A, the front 702 of the bicycle wheel sensor 700 comprises an opening 750. The opening exposes at least a portion of the interior of the bicycle wheel sensor 700 to the environment surrounding the opening 750. For example, within the opening 750 is a pressure sensor 752. The pressure sensor 752 may be similar to pressure sensor 630 described above.

In one embodiment, as shown in FIGS. 7B and 7C, the bicycle wheel sensor 700 may includes external wiring 760 extending from a rear side 704 of the bicycle wheel sensor. The wiring 760 may facilitate the charging of a battery such as battery 620.

Figure 8A:
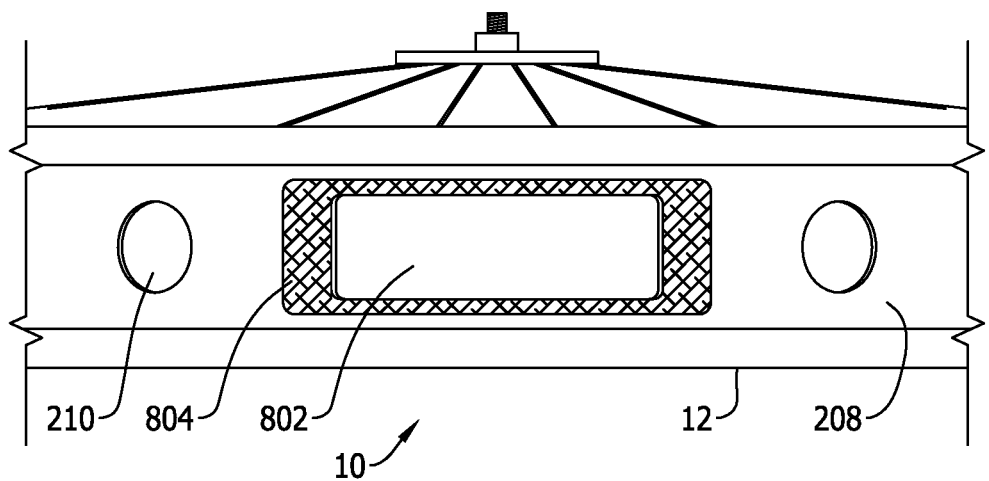
FIG. 8A shows an enlarged view of a bicycle wheel.
Figure 8B:
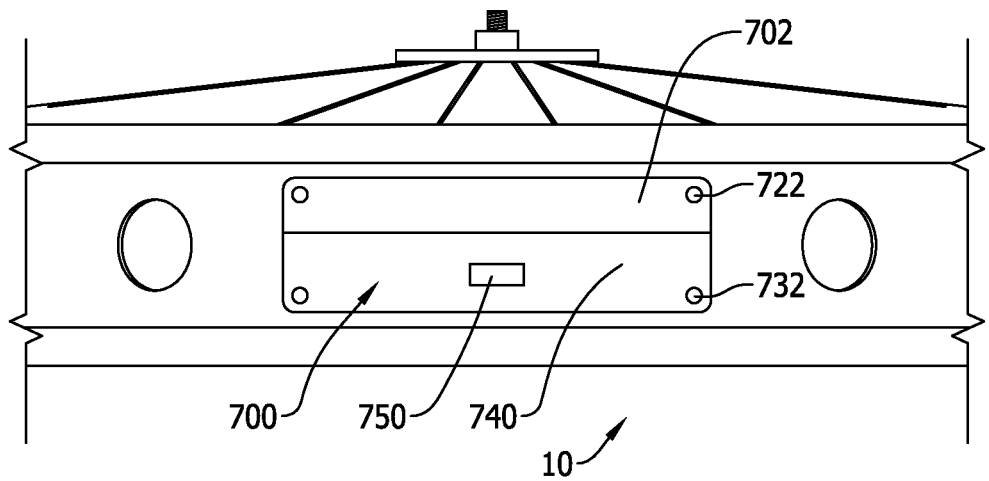
FIG. 8B shows an exemplary embodiment of a bicycle wheel sensor installed on a bicycle wheel.
Figure 8C:
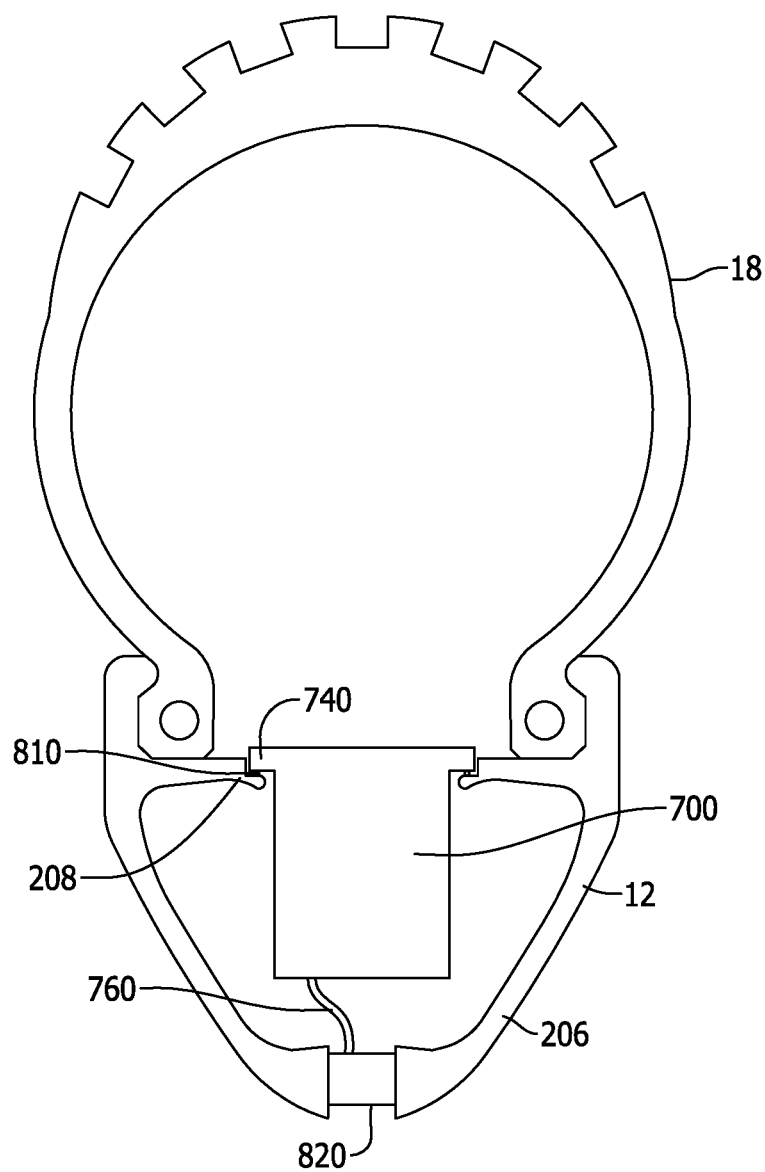
FIG. 8C shows a cross-section of a bicycle wheel with the bicycle wheel sensor installed.

FIG. 8A shows an enlarged view of a bicycle wheel, FIG. 8B shows an exemplary embodiment of a bicycle wheel sensor installed on a bicycle wheel, and FIG. 8C shows a cross-section of a bicycle wheel with the bicycle wheel sensor installed. In this embodiment, to install the bicycle wheel sensor 700, an opening 802 may be formed in the outer rim wall 208 of the rim 12 of the bicycle wheel 10. The opening 802 may be advantageously placed at a position directly opposite the valve stem 20 (see FIG. 1) of the wheel 10 between two spoke holes 210. To facilitate the fit of the bicycle wheel sensor 700, a flat shoulder 804 may be machined in the outer rim wall 208. In some embodiments, instead of the opening 802 and shoulder 804 being machined from a rim 12, the rim may be formed with the opening 802 and shoulder 804.

As shown in FIGS. 8B and 8C, the bicycle wheel sensor 700 may be disposed within the opening 802. Specifically, the rear end 704 of the bicycle wheel sensor 700 is inserted into the opening 802 and back surfaces 744, 748 of the flange 740 is configured to rest on the shoulder 804. Fasteners (not shown) may be used to secure the flange 740 to the outer rim wall 208. Further, a sealing material 810 may be provided on the back surfaces 744, 748 to create a hermetic seal between the back surfaces 744, 748 and the outer rim wall 208. For example, a resilient sealing material 810 such as rubber may be adhered to the back surface 744, 748 that seals against the outer rim wall 208 upon the tightening of the fasteners to force the flange 740 against the outer rim wall 208. Other sealing methods and materials may also be used as are now known or may be later developed.

Similar to the sensor 300, the bicycle wheel sensor 600 allows for direct sensor exposure and measurement of conditions within a tire 18 of a bicycle wheel 10. With the sensor 700 installed as shown in FIGS. 8B and 8C, the opening 750 faces the space between the outer rim wall 208 and the inside of the tire 18. Thus, the sensors in the bicycle wheel sensor 700, such as a pressure sensor 752 may directly and in real time measure the conditions within the tire.

In some embodiments, the wiring 760 may attach to a port 820 installed on an inner wall 206 of the rim 12 to facilitate charging of the sensor 700 without the need to disassemble the wheel 10, as shown in FIG. 8C. For example, a USB charge port 820 may be disposed on the inner wall 206 to which the wiring 760 connects. Thus, when the wheel 10 is not in use, the user may attach a power source to the USB charge port 820 to charge a battery within the sensor 700. Of course, the USB charge port 820 is merely exemplary and other charge ports according to various specifications may also be used.

In some embodiments, the distance between the outer rim wall 208 and inner wall 206 may not be sufficient to fully house the sensor 700. In such cases, a second opening may be formed in the inner wall 206 to accommodate the sensor 700. When the rear 704 of the sensor extends through the inner wall 206, the charge port 810 may be disposed in one of the top and bottom housings 720, 730 in place of the wiring 760.

The bicycle wheel sensor as disclosed herein allows the user to obtain real time information from the inside of a bicycle wheel. Furthermore, the bicycle wheel sensor does not add significant weight to the bicycle, and further serves to balance the wheel. Thus, the bicycle wheel sensor provides a better ride while simultaneously providing useful information to the user concerning the condition of the bicycle wheels.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:
1. A bicycle wheel sensor comprising:
   a housing configured to be at least partially disposed within an area enclosed by a rim and a tire of a bicycle wheel, the housing comprising a mount configured to be mounted to the rim and to be aligned with a spoke hole of the bicycle wheel, wherein the spoke hole at which the mount is aligned is disposed opposite a valve stem location and the housing is configured to extend along the wheel from the spoke hole to at least a point on the bicycle wheel opposite the valve stem location;
   one or more sensors configured to be exposed to the enclosed area and to provide data obtained within the enclosed area; and
   an electronic control unit interfaced to the sensors and configured to transmit data to a user device via a transceiver.

2. The bicycle wheel sensor of claim 1, wherein the housing further comprises one or more balancing weight mounts configured to receive balancing weights.

3. The bicycle wheel sensor of claim 1, wherein the housing comprises an elongated hole to facilitate adjustable positioning of the housing to the bicycle wheel at the spoke hole.

4. The bicycle wheel sensor of claim 1, wherein the one or more sensors comprise a pressure sensor and an accelerometer.

5. The bicycle wheel sensor of claim 1, wherein the transceiver is configured to communicate according to at least one of Bluetooth Low Energy and ANT+ protocols.

6. The bicycle wheel sensor of claim 1, wherein the housing is mounted to the rim via an adhesive.

7. The bicycle wheel sensor of claim 1, wherein the housing is attached to the rim via a fastener.

8. The bicycle wheel sensor of claim 1, wherein the housing is disposed within the area via an expandable foam.

9. The bicycle wheel sensor of claim 1, wherein the housing is attached to a bicycle tube used for inflation disposed within the area.

10. A bicycle wheel sensor comprising:
a housing configured to be at least partially disposed within an area enclosed by a rim and a tire of a bicycle wheel, the housing comprising a flanged portion on a front end thereof, and a rear end of the housing extending through an opening in the rim between spoke holes disposed on the rim;
one or more sensors configured to be exposed to the enclosed area and to provide data obtained within the enclosed area; and
an electronic control unit interfaced to the sensors and configured to transmit data to a user device via a transceiver.

11. The bicycle wheel sensor of claim 10, wherein the opening is disposed opposite a valve stem of the bicycle wheel.

12. The bicycle wheel sensor of claim 10, wherein the flanged portion comprises an aperture exposed to the enclosed area.

13. The bicycle wheel sensor of claim 10, wherein a pressure sensor is disposed within the aperture.

14. The bicycle wheel sensor of claim 10, wherein the flanged portion is hermetically sealed to an outer rim wall of the rim.

15. The bicycle wheel sensor of claim 10, further comprises a charge port disposed on a rim wall of the rim.

16. The bicycle wheel sensor of claim 10, wherein the housing is comprised of a top housing and a bottom housing, the top housing and the bottom housing being hermetically sealed to one another.

17. The bicycle wheel sensor of claim 10, wherein the flanged portion comprises through holes to receive fasteners to attach the flanged portion to the rim.

18. A bicycle wheel sensor comprising:
a housing configured to be at least partially disposed within an area enclosed by a rim and a tire of a bicycle wheel, the housing comprises:
a mount configured to be mounted to the rim and to be aligned with a spoke hole of the bicycle wheel; and
an elongated hole to facilitate adjustable positioning of the housing to the bicycle wheel at the spoke hole;
one or more sensors configured to be exposed to the enclosed area and to provide data obtained within the enclosed area; and
an electronic control unit interfaced to the sensors and configured to transmit data to a user device via a transceiver.

* * * * *